(No Model.)
F. WELLINGTON.
BLACKING BOX HOLDER.
No. 349,328.    Patented Sept. 21, 1886.
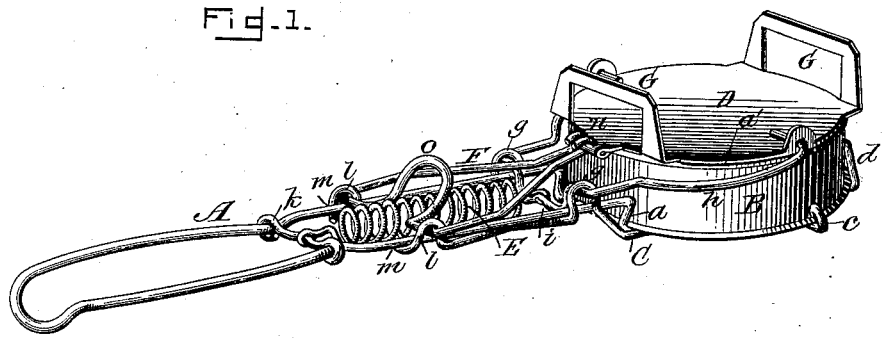
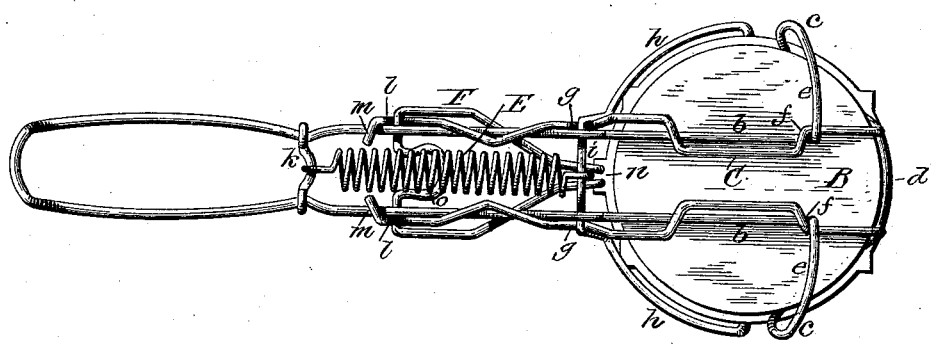
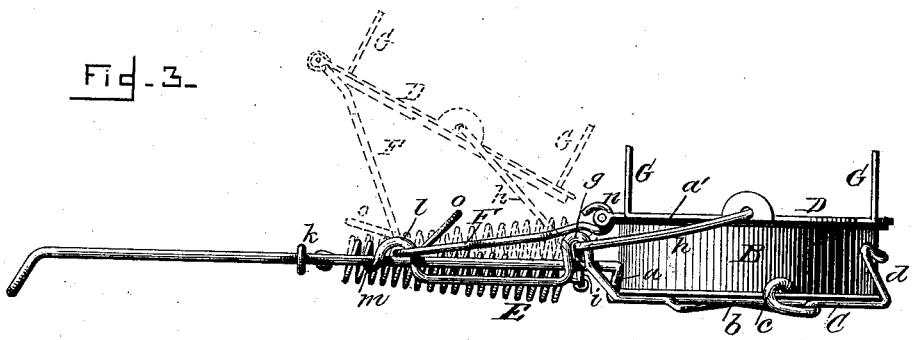
WITNESSES
C. H. Durand
L. L. Miller
INVENTOR
Frederick Wellington.
per Chas. H. Fowler
Attorney

UNITED STATES PATENT OFFICE.

FREDERICK WELLINGTON, OF SAGINAW, MICHIGAN.

BLACKING-BOX HOLDER.

SPECIFICATION forming part of Letters Patent No. 349,328, dated September 21, 1886.

Application filed February 19, 1886. Serial No. 192,525. (No model.)

*To all whom it may concern:*

Be it known that I, FREDERICK WELLINGTON, a citizen of the United States, residing at Saginaw, in the county of Saginaw and State of Michigan, have invented certain new and useful Improvements in Blacking-Box Holders; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, an under side plan view thereof, and Fig. 3 a side elevation showing the cover removed from the box in dotted lines.

The present invention has for its object to provide a simple and effective device with a suitable handle and cover for holding a box of blacking, and in which the cover may be conveniently raised and removed from the box when in use; and the invention consists in the details of construction, substantially as shown in the drawings, and hereinafter described and claimed.

In the drawings, A represents the handle portion of the device, formed, preferably, of wire bent as shown, and the forward ends of the wire bent downwardly to form shoulders *a*, and thence extending outwardly on a different horizontal plane than the handle portion of the wire, to form a support for the box B, containing the blacking. The extremities of the wires, which form the supports *b* for the box, are bent in a lateral direction and outwardly, and terminate in hooks *c*, which catch on the sides of the box or extend under the same, to form a support for the bottom, as preferred. The arms *e* and hooks *c* are not essential features of the invention, and may, if desired, be dispensed with altogether. A second wire is employed, which is so bent as to form a frame, C, adapted to slide on the supports, and at its front end has a clamping-jaw, *d*, to embrace the rim of the box B. The wire from which the frame is constructed interlocks with the juncture of the arms *b e*, as shown at *f*, which form stops to limit the forward movement of the frame C. The frame C extends back some distance, and the wire thereof is bent to form loops *g*, through which pass the arms of a double crank, *i*, upon the rear end of a bail, *h*, a cover, D, being pivotally connected to the free or front ends of said bail. The double crank *i* is located between the arms of the shank portion of the handle, immediately back of the shoulders *a*, and has connected to it a coiled or other suitable spring, E, the rear or opposite end thereof being in like manner attached to a short transverse brace, *k*, on the handle A. The extremities or ends of the wire composing the frame C are bent to form a second pair of eyes, *l*, the wire being brought under the arms of the shank of the handle, as shown at *m*. Through the eyes *l* pass the arms of a lever, F, to form a pivotal connection between the shank of the handle or the frame C and the lever, said lever having a thumb-piece, *o*, for operating it, and the forward ends are hinged in any suitable manner to a cover, D, which may have upon its under side a lining or cushion, *a'*, of rubber, felt, cloth, or other like material, so as to form a tight joint around the edge of the box B when the cover is closed down thereon, said cover being firmly held down in place by the spring E. The spring also, by means of the double crank *i*, holds the cover back out of the way, as shown in dotted lines, when the device is in use.

The cover D is provided with upright loops G, through which the handle of the blacking-brush may be inserted, so that it can be attached to the device when the latter is hung up out of the way, the loops being diametrically opposite each other, and the outer one serving as a means to raise the cover by the fingers or sweep of the brush-handle. By pressing on the thumb-piece *o* in the direction of the handle A, by means of the lever F and bail *h*, the cover will be raised, and when they assume an incline from an upright position the spring E will carry the cover back to the position shown in dotted lines, and by pressing the thumb-piece forward the spring will cause the cover to be closed tightly over the box.

The sliding frame C, with its clamping-jaw *d*, I shall term a "clamping device," and any suitable device that will act in the capacity of a sliding clamp may be substituted.

I have shown and described my device as constructed of wire; but it is not essential that wire should be employed, as other material— such as wood, or cast or sheet metal—may be substituted, as the principal feature of the invention is the manner of attaching and operating the cover by means of a spring, pivoted bail, and hinged lever. Therefore the holder proper, handle, and clamping device may be constructed of wood or metal, or both, and any well-known means may be employed for clamping the box to the holder, as found most convenient.

Having now fully described my invention, what I claim as new, and desire to secure by Letters Patent, is—

1. In a device for holding blacking and similar boxes, a suitable support for the box and means for holding it thereon, and a handle projecting from said support, in combination with a cover, a pivoted bail and lever connected thereto, and a suitable spring attached to the bail and to the handle, substantially as and for the purpose set forth.

2. In a device for holding blacking and similar boxes, a suitable support for the box provided with a handle and means for holding the box on the support, in combination with a cover, a bail pivoted thereto, a spring attached to the bail and to the handle, and a lever hinged to the cover and pivoted at its rear end to the handle or shank thereof, and provided with a thumb-piece for operating it, substantially as and for the purpose specified.

3. In a device for holding blacking and other boxes, a support for the box provided with a handle, and a hinged or pivoted cover provided with upright loops to receive the handle of the blacking-brush when not in use, substantially as and for the purpose described.

4. In a device for holding blacking and similar boxes, a suitable support for the box provided with a handle, a sliding frame having a clamping-jaw for holding the box on the support, in combination with a cover connected to a pivoted bail and a pivoted lever, as described, the opposite end of the bail having a double crank, and a spring attached thereto and to the handle, and the lever provided with a thumb piece, substantially as and for the purpose set forth.

In testimony that I claim the above I have hereunto subscribed my name in the presence of two witnesses.

FREDERICK WELLINGTON.

Witnesses:
OZIAS W. SEYMOUR,
A. H. SWARTHOUT.